United States Patent
Wilson et al.

(10) Patent No.: US 11,060,013 B2
(45) Date of Patent: Jul. 13, 2021

(54) METHODS OF CONTROLLING FINES MIGRATION IN A WELL

(71) Applicant: BAKER HUGHES INCORPORATED, Houston, TX (US)

(72) Inventors: Michael Brendt Wilson, Tomball, TX (US); Charles D. Armstrong, Tomball, TX (US); Mark A. Vorderbruggen, Spring, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 305 days.

(21) Appl. No.: 16/072,666

(22) PCT Filed: Mar. 1, 2017

(86) PCT No.: PCT/US2017/020074
§ 371 (c)(1),
(2) Date: Jul. 25, 2018

(87) PCT Pub. No.: WO2017/151699
PCT Pub. Date: Sep. 8, 2017

(65) Prior Publication Data
US 2019/0002753 A1    Jan. 3, 2019

Related U.S. Application Data

(60) Provisional application No. 62/302,209, filed on Mar. 2, 2016.

(51) Int. Cl.
| | | |
|---|---|---|
| C09K 8/575 | (2006.01) | |
| C09K 8/74 | (2006.01) | |
| C09K 8/68 | (2006.01) | |
| C09K 8/80 | (2006.01) | |
| E21B 43/04 | (2006.01) | |
| E21B 43/267 | (2006.01) | |
| E21B 43/20 | (2006.01) | |
| C09K 8/46 | (2006.01) | |
| C09K 8/57 | (2006.01) | |
| C09K 8/62 | (2006.01) | |
| C09K 8/72 | (2006.01) | |
| C09K 8/582 | (2006.01) | |

(52) U.S. Cl.
CPC ............... *C09K 8/575* (2013.01); *C09K 8/46* (2013.01); *C09K 8/572* (2013.01); *C09K 8/68* (2013.01); *C09K 8/74* (2013.01); *C09K 8/80* (2013.01); *E21B 43/04* (2013.01); *E21B 43/267* (2013.01); *C09K 8/582* (2013.01); *C09K 8/62* (2013.01); *C09K 8/72* (2013.01); *E21B 43/20* (2013.01)

(58) Field of Classification Search
None
See application file for complete search history.

(56) References Cited

U.S. PATENT DOCUMENTS

| | | | |
|---|---|---|---|
| 5,143,155 A * | 9/1992 | Ferris | B09C 1/00 166/246 |
| 6,401,819 B1 * | 6/2002 | Harris | C09K 8/506 166/270 |
| 7,964,539 B2 * | 6/2011 | Kotlar | C09K 8/506 507/233 |
| 2007/0204990 A1 * | 9/2007 | Kotlar | C09K 8/5755 166/276 |
| 2011/0259592 A1 | 10/2011 | Reyes | |
| 2013/0210684 A1 | 8/2013 | Ballard | |
| 2014/0202685 A1 | 7/2014 | Danait et al. | |
| 2014/0303049 A1 * | 10/2014 | Holdsworth | E02D 37/00 507/241 |

FOREIGN PATENT DOCUMENTS

| | | | |
|---|---|---|---|
| CN | 1390276 A | 1/2003 | |
| WO | WO-2006038016 A1 * | 4/2006 | C09K 8/575 |

OTHER PUBLICATIONS

Gamsjager et al., "Solubilities of metal cabonates", Pure &Appl. Chem., vol. 70, No. 10, pp. 1913-1920, 1998.
International Search Report, International Application No. PCT/US2017/020074, dated Jun. 12, 2017, Korean Intellectual Property Office; International Search Report 3 pages.
International Written Opinion, International Application No. PCT/US2017/020074, dated Jun. 12, 2017, Korean Intellectual Property Office; International Written Opinion 9 pages.

* cited by examiner

*Primary Examiner* — Charles R Nold
(74) *Attorney, Agent, or Firm* — Cantor Colburn LLP

(57) ABSTRACT

A method of treating a subterranean formation penetrated by a wellbore comprises: introducing into the subterranean formation a treatment fluid comprising a carbonate producing agent, urea, and a cation source; allowing a carbonate precipitate to form, the carbonate precipitate comprising a cation from the cation source and having a water solubility of less than about 0.1 g/100 mL at 25° C. and atmospheric pressure; and reducing or substantially preventing the passage of formation particles from the subterranean formation into the wellbore while allowing passage of formation fluids from the subterranean formation into the wellbore.

15 Claims, No Drawings

METHODS OF CONTROLLING FINES MIGRATION IN A WELL

CROSS REFERENCE TO RELATED APPLICATIONS

This is a U.S. National Stage of Application No. PCT/US2017/020074, filed on Mar. 1, 2017, which claims the benefit of U.S. Provisional Patent Application No. 62/302,209, filed on Mar. 2, 2016, the disclosures of which are incorporated herein by reference.

BACKGROUND

The disclosure is directed to methods of treating subterranean formations. More specifically, the disclosure relates to methods of controlling fines migration in a well.

During well stimulation, completion, and production operations, clays, sand, micas, feldspars, plagioclase, or other fine particles may be generated. Fines may result from an unconsolidated or inherently unstable formation, or from the use of an incompatible treatment fluid that liberates fine particles. Other sources of fines include particulates added to the wellbore such as fines present in a proppant or produced from partially crushed proppant.

Once generated, formation fines may migrate toward the near wellbore area due to drag or other forces. The migrated fines can plug, erode or cause significant wear of downhole equipment and surface facilities. The fines can also plug or clog flow channels in the formation, thereby significantly reducing well productivity. Thus it would be desirable to provide a method to fix or stabilize fines within a subterranean formation or to filter fines out of the desired production material so that their migration is reduced or substantially prevented.

BRIEF DESCRIPTION

A method of treating a subterranean formation penetrated by a wellbore comprises: introducing into the subterranean formation a treatment fluid comprising a carbonate producing agent, urea, and a cation source; allowing a carbonate precipitate to form, the carbonate precipitate comprising a cation from the cation source and having a water solubility of less than about 0.1 g/100 mL at 25° C. and atmospheric pressure; and reducing or substantially preventing the passage of formation particles from the subterranean formation into the wellbore while allowing passage of formation fluids from the subterranean formation into the wellbore.

A method of forming a fluid-permeable pack in a subterranean formation penetrated by a wellbore comprises: contacting a plurality of particles in the subterranean formation with a carbonate producing agent, urea, and a cation source; applying a shut-in period to allow a carbonate precipitate to form, the carbonate precipitate comprising a cation from the cation source and having a water solubility of less than about 0.1 g/100 mL at 25° C. and atmospheric pressure; consolidating the plurality of particles in the downhole environment with the calcium carbonate precipitate thereby forming the fluid-permeable pack.

A method of reducing fines migration in a subterranean formation penetrated by a wellbore comprises introducing into the subterranean formation a treatment fluid comprising a carbonate producing agent, urea, and a cation source, and an aggregate; allowing a carbonate precipitate to form, the carbonate precipitate comprising a cation from the cation source and having a water solubility of less than about 0.1 g/100 mL at 25° C. and atmospheric pressure; consolidating the aggregate with the carbonate precipitate forming a fluid-permeable pack which is effective to prevent the passage of formation particles from the subterranean formation into the wellbore while allowing passage of formation fluids from the subterranean formation into the wellbore.

DETAILED DESCRIPTION

It has been found that a carbonate precipitate generated in situ in a subterranean formation can effectively consolidate formation fines and/or filter fines out of the desired production material away from the near wellbore area, minimizing or avoiding the problems associated with fines migration. In particular, the inventors have found that a carbonate precipitate can be formed in situ from a cation source, a carbonate producing agent and urea under downhole conditions. The precipitated carbonate partially fill the spaces among various particles, either introduced to the formation or generated from the formation, forming a fluid-permeable pack which is effective in reducing or substantially preventing the passage of formation particles such as formation fines from the subterranean formation into a wellbore while allowing passage of formation fluids from the subterranean formation into the wellbore.

The cation source, carbonate producing agent and urea can be introduced into the subterranean formation through a treatment fluid during a downhole operation such as a hydraulic fracturing operation; an acidizing treatment; a gravel packing operation; a flooding operation; or a combination comprising at least one of the foregoing.

In some embodiments, introducing the treatment fluid and the performing the downhole operation occur simultaneously. Depending on the specific operation performed, the treatment fluid can be fracturing fluids, gravel packing fluids, flooding fluids, acidizing fluids, and the like. In addition to the carbonate producing agent, urea, and cation source, treatment fluids can contain various components known in the art. For example, fracturing fluids can contain proppant particles. Gravel packing fluids can contain gravels. Acidizing fluids contain an acid such as hydrofluoric acid; hydrochloric acid; acetic acid; formic acid; sulfamic acid; or chloroacetic acid.

In other embodiments, performing the downhole operation precedes introducing the treatment fluid. In these embodiments, the treatment fluid containing the carbonate producing agent can be free of proppant particles, gravels, acids, or other components that may be needed for performing fracturing, gravel packing, acidizing, or flooding operations.

The carbonate producing agent in the treatment fluid comprises a microbe, an enzyme, or a combination comprising at least one of the foregoing.

Microbes that have the ability to induce the precipitation of calcium carbonate include those from the genera such as *Bacillus* sp., *Sporosarcina* sp., *Spoloactobacilus* sp., *Clostridium* sp., *Desulfotomaculum* sp. or a combination thereof. Exemplary and non-limiting microbes include *Sporosarcina pasteurii* (formerly known as *Bacillus pasteurii*), *Bacillus megaterium, Sporosarcina ureae, Pseudomonas aeruginosa, Proteus Vulgaris, Bacillus sphaericus, Myxococcus xanthus, Leuconostoc mesenteroides, Bacillus subtilis, Deleya halophila, Halomonas eurihalina, Proteus mirabilis* and *Helicobacter pylori*. Non-pathogenic strains are preferred. *Sporosarcina pasteurii* is specifically mentioned. A combination of different microbes may be used. As used herein, the microbe includes bacteria and bacteria spores. In an embodiment, the treatment fluid contains about $1.0 \times 10^3$ to $1.0 \times 10^8$ bacterial spores/bacteria per gram of the particles to be consolidated.

In an embodiment, the treatment fluid contains nutrients necessary to ensure microbes' survival and multiplication. The nutrients are known to those skilled in the art. They provide the microbes with a source of carbon, nitrogen, and/or other elements essential for their physiological function. If several types of microbes are used, it may be necessary to use different nutrients, corresponding to the needs of each type of microbes. Exemplary nutrients include yeast extract, peptone from soy, industry byproducts such as lactose mother liquor, and corn steep liquor.

Suitable calcium carbonate precipitating enzymes include urease (EC 3.5.1.5), amidase (EC 3.5.1.4), carbonic anhydrase (EC 4.2.1.1), glutamate dehydrogenase such as NAD (P) type (EC 1.4.1.3), glutamate synthase such as NADPH type (EC 1.4.1.13) and FAD type (EC 1.4.7.1). Urease is specifically mentioned. Urease is commercially available. It can be extracted from Jack beans (*Canavalia ensiformis*), watermelon seeds, pea seeds, soy beans, and the like. In an embodiment, the treatment fluid contains about 0.5 M to about 1.0 M or about 0.25 M to about 2.0 M, or about 0.01 M to about 1.0 M of enzymes.

Optionally, the treatment fluid also comprises an enzyme stabilizer. Exemplary stabilizers include but are not limited to casein, albumin, powdered milk, whey protein, or bovine serum albumin, or a combination comprising at least one of the foregoing. The presence of enzyme stabilizers can enhance the activity of the enzymes. In an embodiment an enzyme stabilizer increases the carbonate salt precipitation compared to the same composition without the stabilizer, specifically, the amount of the precipitated carbonate salt formed from an enzyme in the presence of an enzyme stabilizer is about two times greater, five times greater, or ten times greater than the amount of the precipitated carbonate salt formed from an enzyme without the stabilizer.

In an embodiment, the carbonate producing agent is present in an amount effective to form a permeable pack in about 10 minutes to about 48 hours, about 30 minutes to about 36 hours, about 1 hour to about 24 hours, or about 2 hours to about 20 hours in the wellbore.

The urea may be provided in various forms. In an embodiment, the urea is provided as an aqueous solution in water. The effective amount of urea will depend on the amount of the other components and will be enough to ensure the formation of the material of desired strength at a desired rate. In an embodiment, the effective amount of urea in the settable slurries is about 5 mM to about 2 M or about 100 mM to about 1.5 M or about 800 mM to about 1.2 M. Urea can also be combined in a dry state with gravel or other packing substrate.

The cation sources are not particularly limited and include any material that is effective to form a low-solubility carbonate salt or precipitate, when used together with urea and a carbonate producing agent under downhole conditions. As used herein, a low-solubility carbonate salt or precipitate refers to a material that has a water solubility of less than about 0.1 g/100 mL at 25° C. and atmospheric pressure. In some embodiments, the cation sources comprise ions of Be, Mg, Ca, Sr, Ba, Mn, Fe, Co, Ni, Cu, Ag, Zn, Cd, Al, Tl, Pb, Bi, or a combination comprising at least one of the foregoing. A calcium ion source is specifically mentioned. Exemplary cation sources include calcium chloride, calcium bromide, calcium nitrate, calcium oxide, calcium hydroxide, beryllium sulfate, beryllium nitrate, beryllium chloride, magnesium chloride, magnesium sulfate, magnesium oxide, magnesium hydroxide, strontium sulfate, strontium nitrate, barium chloride, barium bromide, barium acetate, barium sulfide, manganese chloride, manganese nitrate, manganese sulfate, manganese bromide, iron chloride, iron sulfate, iron nitrate, cobalt chloride, cobalt sulfate, cobalt nitrate, cobalt sulfate, copper nitrate, copper bromide, copper chloride, copper sulfate, nickel chloride, nickel bromide, nickel nitrate, nickel sulfate, zinc chloride, zinc nitrate, zinc oxide, zinc sulfate, or a combination comprising at least one of the foregoing. In an embodiment, the cation source is present in an amount effective to provide about 2 mM to about 2.5 M, about 10 mM to about 2 M, or about 250 mM to about 1.8 M cations in the treatment fluid. In the event that a liquid carrier or the subterranean formation contains sufficient amount of cation source, no additional cation source needs to be separately added.

The treatment fluid can further comprise an aqueous carrier fluid. The aqueous carrier fluid is present in an amount of about 10% to about 99% by weight, more specifically in an amount of about 20% to about 99% by weight, based on the total weight of the treatment fluid depending on the end use of the fluid. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as 10.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The NaCl salt can be present in the brine in an amount of about 0.5 to about 25 weight percent (wt. %), specifically about 1 to about 15 wt. %, and more specifically about 3 to about 10 wt. %, based on the weight of the brine.

The aqueous carrier fluid of the treatment fluid can be foamed with a liquid hydrocarbon or a gas or liquefied gas such as nitrogen, or air. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in low pressure or water sensitive formations. A mixture of foaming and foam stabilizing dispersants can be used. Generally, the mixture can be included in the treatment fluids in an amount of about 1% to about 5% by volume of water in the treatment fluids.

The various treatment fluids can be varied and adjusted according to well control and compatibility parameters of the particular fluid with which it is associated for example a fracturing fluid, an acidizing fluid, and the like. The treatment fluids can be used to reduce or substantially prevent the migration of fines in the subterranean formation and can be used in vertical, horizontal, or deviated wellbores.

In general, the components of the treatment fluids can be premixed or is injected into the wellbore without mixing, e.g., injected "on the fly" where the components are combined as they are being injected downhole. A pumpable or pourable treatment fluid can be formed by any suitable method. In an exemplary embodiment, the components of the treatment fluid are combined using conventional mixing equipment or equipment used in downhole operations. The treatment fluid can then be injected, e.g., pumped and placed by various conventional pumps and tools to any desired location within the wellbore. In an embodiment, injecting the treatment fluid comprises pumping the fluid via a tubular in the wellbore. For example, the treatment fluid can be pumped into an annulus between a tubular and a wall of the wellbore via the tubular.

Once the treatment fluid has been place in the desired location, the composition is allowed to set. Without wishing to be bound by theory, it is believed that during setting, the microbe or enzyme hydrolyzes urea producing ammonia and carbon dioxide. The carbon dioxide dissolves in water producing carbonic acid, which can react with the cation source to form a carbonate precipitate. The precipitated carbonate salt partially fills the gaps among formation particles thus consolidating the particles or locking the particles together. Depending on the requirements of a particular application, the microbes or enzymes are present in an amount such that the consolidated particles reach at least about 60-90% of its final strength within about 1-10 hours or 2-8 hours after the treatment fluid is pumped downhole.

The particles in the formation that can be consolidated with the carbonate salt precipitated from the cation source includes proppant particles introduced into the formation or derivatives thereof such as crushed proppant particles, particles generated from the formation, or a combination comprising at least one of the foregoing. Particles generated from the formation are not particularly limited. For example, particles may result from an unconsolidated or inherently unstable formation, or from the use of an incompatible treatment fluid that liberates fine particles. Exemplary particles in the formation comprise sand, gravel, crushed stone, slag, recycled concrete, silica, grass spheres, limestone, feldspar, ceramics, or a combination comprising at least one of the foregoing.

In some embodiments, a fluid-permeable pack is formed after consolidating particles in the formation with the precipitated carbonate salt. The particles in the permeable pack can be introduced into the formation together with the treatment fluid. A method of reducing fines migration comprises introducing into the subterranean formation a treatment fluid comprising a carbonate producing agent, urea, and a cation source, and an aggregate; allowing a carbonate precipitate to form, the carbonate precipitate comprising a cation from the cation source and having a water solubility of less than about 0.1 g/100 mL at 25° C. and atmospheric pressure; consolidating the aggregate in the subterranean formation with the carbonate precipitate forming the fluid-permeable pack. In other embodiments, the particles in the fluid-permeable pack include particles generated from the formation.

The term "aggregate" is used broadly to refer to a number of different types of both coarse and fine particulate material, including, but are not limited to, sand, gravel, ceramics, slag, recycled concrete, silica, glass spheres, limestone, feldspar, and crushed stone such as chert, quartzite, and granite. The fine aggregates are materials that almost entirely pass through a Number 4 sieve (ASTM C 125 and ASTM C 33). The coarse aggregate are materials that are predominantly retained on a Number 4 sieve (ASTM C 125 and ASTM C 33). In an embodiment, the aggregate has a size from about 1 µm to about 2000 µm, specifically about 10 µm to about 1000 µm, and more specifically about 10 µm to about 500 µm. As used herein, the size of an aggregate refers to the largest dimension of the aggregate.

In another embodiment a method of forming a fluid-permeable pack in a subterranean formation penetrated by a wellbore comprises: contacting a plurality of particles in the subterranean formation with a carbonate producing agent, urea, and a cation source; applying a shut-in period to allow a carbonate precipitate to form, the carbonate precipitate comprising a cation from the cation source and having a water solubility of less than about 0.1 gram/100 milliliter at 25° C.; consolidating the plurality of particles in the downhole environment with the carbonate precipitate thereby forming the fluid-permeable pack. It is appreciated that when the subterranean formation contains sufficient cation source, a cation source does not have to be introduced separately into the formation.

The permeability of the fluid-permeable pack can be controlled by changing the concentration of one or more of the following component in the treatment fluid: the carbonate producing agent; the urea; or the cation source. Advantageously, the fluid-permeable pack is effective in reducing or substantially preventing the passage of formation particles such as formation fines from the subterranean formation into a wellbore while allowing passage of formation fluids from the subterranean formation into the wellbore.

When used in hydraulic fracturing, the carbonate producing agent, urea, and a cation source may be injected into a subterranean formation in conjunction with a hydraulic fracturing treatment or other treatment at pressures sufficiently high enough to cause the formation or enlargement of fractures. Such other treatments may be near wellbore in nature (affecting near wellbore regions) and may be directed toward improving wellbore productivity and/or controlling the production of fracture proppant or formation sand. Particular examples include gravel packing and "frac-packs."

In another exemplary embodiment, after an acidizing treatment or other well stimulation or remediation operations, a treatment fluid containing a carbonate producing agent, a cation source, and urea can be introduced into the subterranean formation to consolidate the particles such as fines generated from the operations by the precipitated carbonate salt.

In another exemplary embodiment, a gravel packing operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A treatment fluid including the carbonate producing agent, urea, and cation source may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

As an alternative to use of a screen, the fines migration control method may use the carbonate producing agent, urea, and cation source in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel packing screen, may be introduced into a wellbore at pressures below, at or above the fracturing pressure of the formation, such as frac pack, and/or may be employed in conjunction with resins such as sand consolidation resins if so desired.

Set forth below are various embodiments of the disclosure.

Embodiment 1. A method of treating a subterranean formation penetrated by a wellbore, the method comprising:

introducing into the subterranean formation a treatment fluid comprising a carbonate producing agent, urea, and a cation source;

allowing a carbonate precipitate to form, the carbonate precipitate comprising a cation from the cation source and having a water solubility of less than about 0.1 g/100 mL at 25° C. and atmospheric pressure; and reducing or substantially preventing the passage of formation particles from the subterranean formation into the wellbore while allowing passage of formation fluids from the subterranean formation into the wellbore. Optionally the cation source comprises ions of Be, Mg, Ca, Sr, Ba, Mn, Fe, Co, Ni, Cu, Ag, Zn, Cd, Al, Tl, Pb, Bi, or a combination comprising at least one of the foregoing.

Embodiment 2. The method of Embodiment 1, further comprising performing a downhole operation comprising one or more of the following: a hydraulic fracturing operation; an acidizing treatment; a gravel packing operation; or a flooding operation.

Embodiment 3. The method of Embodiment 2, wherein introducing the treatment fluid and the performing the downhole operation occur simultaneously.

Embodiment 4. The method of Embodiment 2, wherein performing the downhole operation precedes introducing the treatment fluid.

Embodiment 5. The method of any one of Embodiments 1 to 4, further comprising forming a fluid-permeable pack from a plurality of particles in the subterranean formation by consolidating the particles with the carbonate precipitate, the proppant pack having a permeability that reduces or substantially prevents the passage of formation particles from the subterranean formation into the wellbore while allows passage of formation fluids from the subterranean formation into the wellbore.

Embodiment 6. The method of Embodiment 5, wherein the plurality of particles in the subterranean formation comprise proppant particles introduced into the formation or derivatives thereof, particles generated from the formation, or a combination comprising at least one of the foregoing.

Embodiment 7. The method of Embodiment 5 or Embodiment 6, wherein the particles in the formation comprise sand, gravel, crushed stone, slag, recycled concrete, silica, grass spheres, limestone, feldspar, ceramics, or a combination comprising at least one of the foregoing.

Embodiment 8. The method of any one of Embodiments 5 to 7, further comprising adjusting the permeability of the fluid-permeable pack by changing the concentration of one or more of the following components in the treatment fluid: the carbonate producing agent; the urea; or the cation source.

Embodiment 9. The method of any one of Embodiments 5 to 8, wherein the fluid-permeable pack is disposed in a fracture created by a hydraulic fracturing operation.

Embodiment 10. The method of any one of Embodiments 5 to 8, further comprising installing a screen device in the wellbore.

Embodiment 11. The method of Embodiment 10, wherein the fluid-permeable pack is disposed in an annular area between the exterior of the screen device and the interior of the wellbore.

Embodiment 12. A method of forming a fluid-permeable pack in a subterranean formation penetrated by a wellbore, the method comprising:

contacting a plurality of particles in the subterranean formation with a carbonate producing agent, urea, and a cation source;

applying a shut-in period to allow a carbonate precipitate to form, the carbonate precipitate comprising a cation from the cation source and having a water solubility of less than about 0.1 g/100 mL at 25° C. and atmospheric pressure; and consolidating the plurality of particles in the subterranean formation with the precipitated calcium carbonate thereby forming the fluid-permeable pack. Optionally, the cation source comprises ions of Be, Mg, Ca, Sr, Ba, Mn, Fe, Co, Ni, Cu, Ag, Zn, Cd, Al, Tl, Pb, Bi, or a combination comprising at least one of the foregoing.

Embodiment 13. A method of reducing fines migration in a subterranean formation penetrated by a wellbore, the method comprising introducing into the subterranean formation a treatment fluid comprising a carbonate producing agent, urea, a cation source, and an aggregate;

allowing a calcium carbonate precipitate to form, the carbonate precipitate comprising a cation from the cation source and having a water solubility of less than about 0.1 g/100 mL at 25° C. and atmospheric pressure; and consolidating the aggregate in the subterranean formation with the carbonate precipitate forming a fluid-permeable pack which is effective to prevent the passage of formation particles from the subterranean formation into the wellbore while allowing passage of formation fluids from the subterranean formation into the wellbore. Optionally, the cation source comprises ions of Be, Mg, Ca, Sr, Ba, Mn, Fe, Co, Ni, Cu, Ag, Zn, Cd, Al, Tl, Pb, Bi, or a combination comprising at least one of the foregoing.

Embodiment 14. The method of Embodiment 13, wherein the aggregate has an average particle size of about 10 μm to about 500 μm.

Embodiment 15. The method of any one of Embodiments 1 to 14, wherein the carbonate producing agent comprises a microbe, an enzyme, or a combination comprising at least one of the foregoing.

Embodiment 16. The method of Embodiment 15, wherein microbe is from a genus selected from *Bacillus* sp., *Sporosarcina* sp., *Spoloactobacilus* sp., *Clostridium* sp., *Desulfotomaculum* sp., or a combination thereof.

Embodiment 17. The method of Embodiment 15, wherein the microbe comprises *Sporosarcina pasteurii*; *Bacillus megaterium, Sporosarcina ureae*; *Pseudomonas aeruginosa*; *Proteus Vulgaris*; *Bacillus sphaericus*; *Myxococcus xanthus*; *Leuconostoc mesenteroides*; *Bacillus subtilis*; *Deleya halophila*; *Halomonas eurihalina, Proteus mirabilis*; or *Helicobacter pylori*, or a combination comprising at least one of the foregoing.

Embodiment 18. The method of Embodiment 15, wherein the enzyme comprises urease, amidase, carbonic anhydrase, glutamate dehydrogenase, glutamate synthase, or a combination comprising at least one of the foregoing.

Embodiment 19. The method of any one of Embodiments 1 to 18, wherein the cation source comprises calcium chloride, calcium bromide, calcium nitrate, or a combination comprising at least one of the foregoing.

Embodiment 20. The method of any one of Embodiments 1 to 19, wherein the treatment fluid further comprises an enzyme stabilizer, a nutrient for the microbe, or a combination comprising at least one of the foregoing.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of treating a subterranean formation penetrated by a wellbore, the method comprising:
   introducing into the subterranean formation a treatment fluid comprising a carbonate producing agent, urea, and a cation source;
   allowing a calcium carbonate precipitate to form, the carbonate precipitate comprising a cation from the cation source and having a water solubility of less than about 0.1 g/100 mL at 25° C. and atmospheric pressure; and
   reducing or preventing the passage of formation particles from the subterranean formation into the wellbore while allowing passage of formation fluids from the subterranean formation into the wellbore,
   wherein the carbonate producing agent comprises an enzyme, and the treatment fluid further comprises an enzyme stabilizer, the enzyme stabilizer comprising casein, albumin, powdered milk, whey protein, or bovine serum albumin, or a combination comprising at least one of the foregoing.

2. The method of claim 1, further comprising performing a downhole operation comprising one or more of the following: a hydraulic fracturing operation; an acidizing treatment; a gravel packing operation; or a flooding operation.

3. The method of claim 2, wherein introducing the treatment fluid and the performing the downhole operation occur simultaneously or performing the downhole operation precedes introducing the treatment fluid.

4. The method of claim 1, further comprising:
   forming a fluid-permeable pack from a plurality of particles in the subterranean formation by consolidating the particles with the carbonate precipitate,
   the fluid-permeable pack having a permeability that reduces or prevents the passage of formation particles from the subterranean formation into the wellbore while allows passage of formation fluids from the subterranean formation into the wellbore.

5. The method of claim 4, wherein the particles in the formation comprise sand, gravel, crushed stone, slag, recycled concrete, silica, grass spheres, limestone, feldspar, ceramics, or a combination comprising at least one of the foregoing.

6. The method of claim 4, further comprising adjusting the permeability of the fluid-permeable pack by changing the concentration of one or more of the following components in the treatment fluid: the carbonate producing agent; the urea; or the cation source.

7. The method of claim 4, wherein the fluid-permeable pack is disposed in a fracture created by a hydraulic fracturing operation.

8. The method of claim 4, further comprising installing a screen device in the wellbore, wherein the fluid-permeable pack is disposed in an annular area between the exterior of the screen device and the interior of the wellbore.

9. The method of claim 1, wherein the carbonate producing agent further comprises a microbe.

10. The method of claim 9, wherein microbe is from a genus selected from *Bacillus* sp., *Sporosarcina* sp., *Spoloactobacilus* sp., *Clostridium* sp., *Desulfotomaculum* sp., or a combination thereof.

11. The method of claim 1, wherein the enzyme comprises urease, amidase, carbonic anhydrase, glutamate dehydrogenase, glutamate synthase, or a combination comprising at least one of the foregoing.

12. The method of claim 1, wherein the cation ion source comprises calcium chloride, calcium bromide, calcium nitrate, or a combination comprising at least one of the foregoing.

13. The method of claim 9, wherein the treatment fluid further comprises a nutrient for the microbe.

14. The method of claim 1, further comprising applying a shut-in period to allow the calcium carbonate precipitate to form.

15. The method of claim 1, wherein the enzyme stabilizer comprises casein.

* * * * *